US006908707B2

United States Patent
Yamamoto et al.

(10) Patent No.: US 6,908,707 B2
(45) Date of Patent: Jun. 21, 2005

(54) POSITIVE ELECTRODE MATERIAL AND NICKEL-ZINC BATTERY

(75) Inventors: Kenta Yamamoto, Fukushima (JP); Osamu Takahashi, Miyagi (JP); Kazuo Honda, Fukushima (JP); Kuniyasu Oya, Fukushima (JP)

(73) Assignee: Sony Corporation, Tokyo (JP)

( * ) Notice: Subject to any disclaimer, the term of this patent is extended or adjusted under 35 U.S.C. 154(b) by 46 days.

(21) Appl. No.: 10/457,288

(22) Filed: Jun. 9, 2003

(65) Prior Publication Data

US 2003/0211393 A1 Nov. 13, 2003

Related U.S. Application Data

(62) Division of application No. 09/838,453, filed on Apr. 19, 2001, now Pat. No. 6,686,091.

(30) Foreign Application Priority Data

Apr. 21, 2000 (JP) ..................................... P2000-121339
May 17, 2000 (JP) ..................................... P2000-145601
Mar. 5, 2001 (JP) ..................................... P2001-060394

(51) Int. Cl.$^7$ ................................................ H01M 4/32
(52) U.S. Cl. ..................... 429/223; 429/229; 429/232; 252/182.1; 252/518.1; 252/521.2; 423/594.4; 423/594.3
(58) Field of Search .................. 429/223, 229, 429/232; 252/182.1, 518.1, 521.2; 423/594.4, 594.3

(56) References Cited

U.S. PATENT DOCUMENTS

| 5,905,003 | A | * | 5/1999 | Young et al. | ................ 429/223 |
| 6,074,785 | A | * | 6/2000 | Dansui et al. | ............... 429/223 |
| 6,228,535 | B1 | | 5/2001 | Fierro et al. | ................ 429/223 |
| 6,333,126 | B2 | * | 12/2001 | Maruta | ........................ 429/223 |
| 6,706,442 | B1 | * | 3/2004 | Sakamoto et al. | .......... 429/223 |

* cited by examiner

Primary Examiner—Laura Weiner
(74) Attorney, Agent, or Firm—Sonnenschein, Nath & Rosenthal LLP

(57) ABSTRACT

The present invention provides a nickel-zinc battery of an inside-out structure, that is, a battery comprising a positive electrode containing beta-type nickel oxyhydroxide and a negative electrode containing zinc and having a similar structure to an alkali manganese battery, in which the beta-type nickel oxyhydroxide consists of substantially spherical particles, mean particle size of which is within a range from 19 μm to a maximum of 40 μm, the bulk density of which is within a range from 1.6 g/cm$^3$ to a maximum of 2.2 g/cm$^3$, tap density of which is within a range from 2.2 g/cm$^3$ to a maximum of 2.7 g/cm$^3$, specific surface area which based on BET method is within a range from 3 m$^2$/g to a maximum of 50 m$^2$/g, and the positive electrode of the nickel zinc battery contains graphite powder, where the weight ratio of graphite powder against a total weight of the positive electrode is defined within a range from 4% to a maximum of 8%.

9 Claims, 18 Drawing Sheets

FIG. 11

| SAMPLE NO. | WEIGHT COMPOSITION | | | FILLING AMOUNT OF POSITIVE ELECTRODE MIXTURE (g PER BATTERY) |
|---|---|---|---|---|
| | POSITIVE ELECTRODE ACTIVE MATERIAL | GRAPHITE (%) | POTASSIUM HYDROXIDE SOLUTION (%) | |
| | KINDS / (%) | | | |
| 1 | ELECTROLYZED MANGANESE DIOXIDE / 85 | 8 | 7 | 10.5 |
| 2 | BETA-TYPE NICKEL OXYHYDROXIDE (SPHERICAL) / 85 | 8 | 7 | 10.0 |
| 3 | GAMMA-TYPE NICKEL OXYHYDROXIDE (SPHERICAL) / 85 | 8 | 7 | 9.3 |
| 4 | BETA-TYPE NICKEL OXYHYDROXIDE (NON-SPHERICAL) / 85 | 8 | 7 | 9.3 |

FIG. 12

| SAMPLE NO. | DISCHARGE CAPACITY (mWh) |
|---|---|
| 1 | 490 |
| 2 | 1275 |
| 3 | 880 |
| 4 | 890 |

FIG. 13

| SAMPLE NO. | PRODUCTION METHOD | CRYSTAL FORM | SPECIFIC SURFACE AREA (m²/g) | DISCHARGE CAPACITY (mWh) AT 1500mW TO 1.0V | |
|---|---|---|---|---|---|
| | | | | BEFORE STORAGE AT 60 °C | AFTER STORAGE AT 60 °C, FOR 20 DAYS |
| 5 | CHEMICAL OXIDATION | β-TYPE | 1 | 680 | 450 |
| 6 | | | 2 | 900 | 550 |
| 7 | | | 3 | 1150 | 625 |
| 8 | | | 4 | 1180 | 635 |
| 9 | | | 5 | 1200 | 640 |
| 10 | | | 10 | 1230 | 640 |
| 11 | | | 15 | 1250 | 650 |
| 12 | | | 20 | 1265 | 660 |
| 13 | | | 25 | 1275 | 660 |
| 14 | | | 30 | 1280 | 665 |
| 15 | | | 35 | 1280 | 665 |
| 16 | | | 40 | 1275 | 660 |
| 17 | | | 45 | 1270 | 655 |
| 18 | | | 50 | 1270 | 650 |
| 19 | | | 55 | 1265 | 500 |
| 24 | | | 60 | 1265 | 300 |
| 25 | ELECTROLYTIC OXIDATION | β-TYPE | 3 | 1155 | 400 |
| 26 | | | 15 | 1255 | 380 |
| 27 | | | 35 | 1280 | 300 |
| 28 | | | 50 | 1275 | 280 |
| 21 | CHEMICAL OXIDATION | γ-TYPE | 3 | 790 | 650 |
| 22 | | | 15 | 850 | 630 |
| 23 | | | 85 | 880 | 615 |
| 24 | | | 50 | 890 | 595 |

FIG. 14

| SAMPLE NO. | POTASSIUM CONTENTS IN BETA-TYPE NICKEL OXYHYDROXIDE (% BY WEIGHT) | SYNTHESIZING CONDITION ||||
|---|---|---|---|---|---|
| | | KOH DENSITY (% BY WEIGHT) | TEMPERATURE (°C) | TIME (hr) | PRESSURE (Mpa) |
| 29 | 0.0 | 40 | APPROX. 40~50 | 0 | NORMAL PRESSURE |
| 30 | 0.5 | | | APPROX.10 | |
| 31 | 1.0 | | | APPROX.20 | |
| 32 | 1.5 | | | APPROX.30 | |
| 33 | 2.0 | | | APPROX.40 | |
| 34 | 2.5 | | APPROX. 50~60 | APPROX.50 | |
| 35 | 3.0 | | | APPROX.60 | |
| 36 | 3.5 | | | APPROX.30 | APPROX. 0.3~0.5 |
| 37 | 4.0 | | | APPROX.30 | APPROX. 0.5~0.7 |
| 38 | 4.5 | | | APPROX.50 | APPROX. 0.7~0.9 |
| 39 | 5.0 | | | APPROX.60 | |

FIG. 15

| SAMPLE NO. | WEIGHT COMPOSITION (%) | | | WEIGHT CONTENTS OF POTASSIUM IN BETA-TYPE NICKEL OXYHYDROXIDE (% BY WEIGHT) | FILLING AMOUNT OF POSITIVE ELECTRODE MIXTURE (g PER BATTERY) |
|---|---|---|---|---|---|
| | BETA-TYPE NICKEL OXYHYDROXIDE | GRAPHITE | POTASSIUM HYDROXIDE SOLUTION | | |
| 29 | 85 | 8 | 7 | 0.0 | 10 |
| 30 | | | | 0.5 | |
| 31 | | | | 1.0 | |
| 32 | | | | 1.5 | |
| 33 | | | | 2.0 | |
| 34 | | | | 2.5 | |
| 35 | | | | 3.0 | |
| 36 | | | | 3.5 | |
| 37 | | | | 4.0 | |
| 38 | | | | 4.5 | |
| 39 | | | | 5.0 | |

FIG. 16

| SAMPLE NO. | | WEIGHT CONTENTS OF POTASSIUM IN BETA-TYPE NICKEL OXYHYDROXIDE (% BY WEIGHT) | DISCHARGE CAPACITY (mWh) | | | |
|---|---|---|---|---|---|---|
| | | | 100mW DIS-CHARGE | 500mW DIS-CHARGE | 1000mW DIS-CHARGE | 1500mW DIS-CHARGE |
| 29 | BEFORE STORAGE | 0.0 | 3120 | 2020 | 1445 | 1280 |
| 30 | | 0.5 | 3120 | 2025 | 1440 | 1275 |
| 31 | | 1.0 | 3120 | 2020 | 1450 | 1285 |
| 32 | | 1.5 | 3120 | 2015 | 1445 | 1285 |
| 33 | | 2.0 | 3120 | 2020 | 1450 | 1280 |
| 34 | | 2.5 | 3115 | 2025 | 1445 | 1280 |
| 35 | | 3.0 | 3125 | 2020 | 1445 | 1280 |
| 36 | | 3.5 | 3120 | 2015 | 1440 | 1275 |
| 37 | | 4.0 | 3115 | 2025 | 1450 | 1280 |
| 38 | | 4.5 | 3125 | 2020 | 1445 | 1280 |
| 39 | | 5.0 | 3120 | 2020 | 1445 | 1280 |

FIG. 17

| SAMPLE NO. | WEIGHT CONTENTS OF POTASSIUM IN BETA-TYPE NICKEL OXYHYDROXIDE (% BY WEIGHT) | DISCHARGE CAPACITY (mWh) | | | |
|---|---|---|---|---|---|
| | | 100mW DIS-CHARGE | 500mW DIS-CHARGE | 1000mW DIS-CHARGE | 1500mW DIS-CHARGE |
| 29 | AFTER STORAGE | 0.0 | 2340 | 1210 | 795 | 665 |
| 30 | | 0.5 | 2340 | 1230 | 810 | 680 |
| 31 | | 1.0 | 2370 | 1250 | 825 | 690 |
| 32 | | 1.5 | 2375 | 1255 | 840 | 705 |
| 33 | | 2.0 | 2530 | 1415 | 940 | 795 |
| 34 | | 2.5 | 2620 | 1555 | 1070 | 870 |
| 35 | | 3.0 | 2750 | 1720 | 1200 | 1025 |
| 36 | | 3.5 | 2755 | 1740 | 1215 | 1040 |
| 37 | | 4.0 | 2780 | 1760 | 1230 | 1060 |
| 38 | | 4.5 | 2790 | 1780 | 1230 | 1075 |
| 39 | | 5.0 | 2810 | 1785 | 1245 | 1090 |

FIG. 18

| SAMPLE NO. | WEIGHT COMPOSITION ||| FILLING AMOUNT OF POSITIVE ELECTRODE MIXTURE (g PER BATTERY) |
| --- | --- | --- | --- | --- |
| | BETA-TYPE NICKEL OXYHYDROXIDE (SPHERICAL) (%) | GRAPHITE (%) | POTASSIUM HYDROXIDE SOLUTION (%) | |
| 40 | 91 | 2 | 7 | 10.0 |
| 41 | 90 | 3 | 7 | 10.0 |
| 42 | 89 | 4 | 7 | 10.0 |
| 43 | 88 | 5 | 7 | 10.0 |
| 44 | 87 | 6 | 7 | 10.0 |
| 45 | 86 | 7 | 7 | 10.0 |
| 46 | 85 | 8 | 7 | 10.0 |
| 47 | 84 | 9 | 7 | 10.0 |
| 48 | 83 | 10 | 7 | 10.0 |

FIG. 19

| SAMPLE NO. | DISCHARGE CAPACITY (mWh) |
|---|---|
| 40 | 500 |
| 41 | 875 |
| 42 | 1250 |
| 43 | 1300 |
| 44 | 1325 |
| 45 | 1300 |
| 46 | 1275 |
| 47 | 1125 |
| 48 | 1000 |

POSITIVE ELECTRODE MATERIAL AND NICKEL-ZINC BATTERY

RELATED APPLICATION DATA

The present application is a divisional of application Ser. No. 09/838,453, filed Apr. 19, 2001, now U.S. Pat. No. 6,686,091, which is incorporated herein by reference to the extent permitted by law.

BACKGROUND OF THE INVENTION

The present invention relates to beta-type nickel oxyhydroxide and a method of producing thereof, and yet, also relates to a positive electrode active material composed of beta-type nickel oxyhydroxide. Further, the present invention relates to a nickel-zinc battery incorporating a positive electrode comprising beta-type nickel oxyhydroxide as a positive electrode active material and a negative electrode comprising zinc as a negative electrode active material.

In recent years, compact-size portable electronic apparatuses, especially portable game players, digital cameras and digital video-camera recorders, or the like, have been propagated very significantly. It is expected that these compact-size portable electronic apparatus will be propagated furthermore from now on, and thus, demand for compact-size battery serving as a power-supply source for these compact-size portable electronic apparatuses will also be promoted quickly. Generally, any of those compact-size portable electronic apparatuses utilizes a high operating voltage and requires a large amount of current, and thus, a usable power source must be distinguished in discharge characteristic under heavy load.

Of those batteries satisfying the above requirements, such a alkaline-manganese battery has already been propagated most widely, which comprises manganese dioxide for composing the positive electrode and zinc for the negative electrode, and yet, it also comprises highly concentrated alkaline aqueous solution for composing electrolytic solution. Inasmuch as manganese dioxide and zinc are respectively inexpensive, and yet, because of high energy density per weight, not only for the power-supply source of compact-size portable electronic apparatuses, but the alkaline-manganese battery is also utilized extensively.

Considering further utility for compact-size portable electronic apparatuses and in order to further improve discharge characteristic under heavy load, a wide variety of improvements have been achieved in a range from battery material to the composition of battery itself. However, in the above alkaline-manganese battery, inasmuch as a positive electrode active material comprising manganese dioxide performs discharge based on homogeneous solid-phase chemical reaction, as a result of discharge, voltage gradually lowers whereby drawing such a discharge curve of downward-sloping. Because of this, in such a compact-size portable electronic apparatus requiring a high voltage and a large amount of current, basically, discharge performance of the alkaline-manganese battery can hardly suffice practical need, and yet, despite of a variety of improvements thus far effected, duration of actually operable capacity of such a compact-size portable electronic apparatus has thus been extended by a negligible extent. Further, any of the modern compact-size portable electronic apparatuses is apt to perform own operation with a relatively higher voltage and a greater amount of current in the initial stage of distribution in the market. To deal with this tendency, it is imperative that such a battery compatible with a newer model of any of compact-size portable electronic apparatuses and capable of preserving distinguished durability to heavy load be provided as essential requirements.

To suffice the above requirements, a nickel-zinc battery has thus been proposed. The nickel-zinc battery comprises its positive electrode comprising nickel oxyhydroxide and its negative electrode comprising zinc, which contains such an operating voltage and durability to heavy load respectively being higher than those of the above alkaline-manganese battery. On the other hand, nickel oxyhydroxide as a positive electrode active material easily generates oxygen and a large amount of self-discharge as problems to solve. As a method for solving these problems, for example, the Japanese Laid-Open Patent Publication No. HEISEI-10-214621 (1998) proposes such a nickel-zinc battery having an "inside-out" type structure with a less amount of self-discharge by utilizing gamma-type nickel oxyhydroxide ($\gamma$—NiOOH) for composing a positive electrode active material.

Such a battery utilizing the above-cited gamma-type nickel oxyhydroxide has a small amount of self-discharge, and has higher operating potential than that of an alkaline manganese battery. However, it is a problem that such a battery cannot have large discharge capacity because the above gamma-type nickel oxyhydroxide has relatively low density.

SUMMARY OF THE INVENTION

The object of the present invention is to provide such a nickel-zinc battery having such a discharge voltage higher than that of an alkaline-manganese battery and distinguished in the large-current discharge characteristic.

The present invention introduces such a positive electrode active material comprising beta-type nickel oxyhydroxide consisting of substantially spherical particles. Preferably, mean particle size of the beta-type nickel oxyhydroxide is within a range from 19 $\mu$m to a maximum of 40 $\mu$m. Preferably, bulk density of the beta-type nickel oxyhydroxide is within a range from 1.6 g/cm$^3$ to a maximum of 2.2 g/cm$^3$. Preferably, tap density is within a range from 2.2 g/cm$^3$ to a maximum of 2.7 g/cm$^3$. Preferably, specific surface area of beta-type nickel oxyhydroxide based on BET method is within a range from 3 m$^2$/g to a maximum of 50 m$^2$/g.

The above-referred beta-type nickel oxyhydroxide for composing the positive electrode active material used for implementing the present invention is previously treated with alkaline aqueous solution and contains alkaline cation between layers of the beta-type nickel oxyhydroxide.

Further, the nickel-zinc battery proposed by the present invention utilizes the above-referred beta-type nickel oxyhydroxide for composing positive electrode active material. The positive electrode at least contains beta-type nickel oxyhydroxide and graphite powder, where the weight ratio of graphite powder against a total weight of the positive electrode is defined within a range from 4% to a maximum of 8%.

According to the present invention, it is possible to secure such nickel oxyhydroxide with least self-discharge, and yet, such a nickel-zinc battery using said nickel oxyhydroxide for composing positive electrode active material as the one embodied by the invention generates such an operating voltage and distinguished durability to heavy load respectively being higher than those of conventional alkaline-manganese batteries.

BRIEF DESCRIPTION OF THE DRAWINGS

FIG. 11 is a table showing compositions of the sample batteries 1 to 4;

FIG. 12 is a table showing discharge capacities of the sample batteries 1 to 4;

FIG. 13 is a table showing the classification and the battery properties of the sample batteries 5 to 28;

FIG. 14 is a table showing processing conditions for the sample batteries 29 to 39;

FIG. 15 is a table showing compositions of the sample batteries 29 to 39;

FIG. 16 is a table showing discharge capacities of the sample batteries 29 to 39 before storage;

FIG. 17 is a table showing discharge capacities of the sample batteries 29 to 39 after storage;

FIG. 18 is a table showing compositions of the sample batteries 40 to 48;

FIG. 19 is a table showing discharge capacities of the sample batteries 40 to 48.

DESCRIPTION OF THE PREFERRED EMBODIMENTS

Practical forms for implementing the present invention in relation to beta-type nickel oxyhydroxide and method of producing the nickel oxyhydroxide, a positive electrode active material, and a nickel-zinc battery, are described below.

Figure 1:
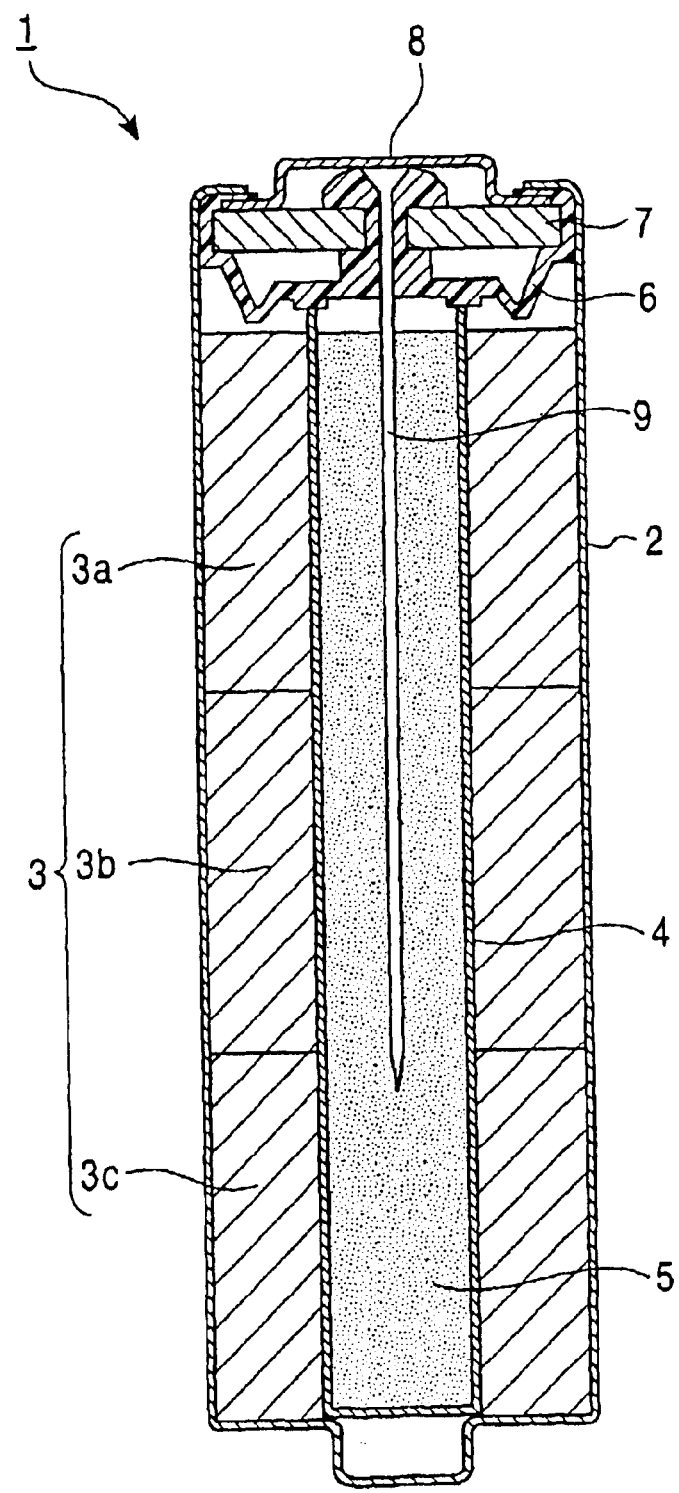
FIG. 1 is a vertical cross-sectional view of a nickel-zinc battery according to a practical form for embodying the present invention.

FIG. 1 is a vertical cross-sectional view of a nickel-zinc battery 1 as an example of a battery according to an embodiment of the present invention. The nickel-zinc battery 1 comprises the following: a battery can 2, a positive electrode 3, a separator 4, a negative electrode mixture 5, a sealing member 6, a washer 7, a negative electrode terminal plate 8, and a current collecting pin 9.

The battery can 2 is made of iron plated with nickel, for example, which constitutes an external positive electrode terminal of the nickel-zinc battery 1.

The positive electrode 3 is of a hollow cylindrical form. Beta-type nickel oxyhydroxide, graphite powder as electrically conductive agent, and electrolytic aqueous solution of potassium hydride jointly formulate positive electrode mixture. The positive electrode mixture is molded into a hollow cylindrical form to prepare positive electrode pellets 3a, 3b, and 3c, which are serially laminated inside of the battery can 2.

The separator 4 is of hollow cylindrical form and disposed inside of the positive electrode 3.

The negative electrode mixture 5 comprises zinc particles for composing a negative electrode active material, electrolytic solution using aqueous solution of potassium hydride, and gelling agent which initially gels the negative electrode mixture 5 and then causes zinc particles to be dispersed in the electrolytic solution evenly.

The battery can 2 internally stores the positive electrode 3 and the separator 4 filled with the negative electrode mixture 5. An aperture of the battery can 2 is coupled with the sealing member 6 for sealing the aperture. The sealing member 6 is made of plastic material. Further, by way of concealing the sealing member 6, the washer 7 and the negative electrode terminal plate 8 are secured to the sealing member 6. Further, the current collecting pin 9 made of brass is inserted into a through-hole of the sealing member 6 secured with the washer 7 from the upper position.

By way of inserting the nail-form current-collecting pin 9 welded to the negative electrode terminal plate 8 into a through-hole formed at the center of the sealing member 6, the current-collecting pin 9 reaches the negative electrode mixture whereby enabling the negative electrode to collect current. By way of connecting the positive electrode 3 to the battery can 2, the positive electrode can collect current. External circumferential surface of the battery can 2 is fully concealed by an external label (not shown). A positive electrode terminal is positioned to the bottom of the battery can 2.

The inventive battery comprising the above structural components generates own positive electrode reaction, negative electrode reaction, total reaction, and theoretical electromotive force by way of the following:

Positive electrode reaction: $NiOOH+H_2O+e^-\rightarrow Ni(OH)_2+OH^- \; E_0=0.49V$ Negative electrode reaction: $Zn+2OH^-\rightarrow ZnO+H_2O+2e^- \; E_0=-1.25V$ Total reaction: $2NiOOH+Zn+H_2O\rightarrow 2Ni(OH)_2+ZnO$ Theoretical electromotive force: $E_0=1.74V$ As is clear from the above chemical formulas, nickel hydride and zinc oxide are respectively generated from nickel oxyhydroxide and zinc via discharge reaction.

Nickel oxyhydroxide for composing a positive electrode active material is used for composing activating material of secondary batteries such as a nickel-hydrogen battery and a nickel-cadmium battery. It is well known that these batteries proved surpassing discharge performance. Nickel oxyhydroxide includes two kinds consisting of beta-type and gamma-type. Normally, these components can easily be generated by way of electrolytically oxidizing nickel hydroxide via so-called electrolytic oxidizing method. Nevertheless, the synthesized nickel oxyhydroxide, in particular, the beta-type nickel oxyhydroxide generates substantial self-discharge to result in the generation of oxygen gas, and thus, in terms of storage characteristic and resistant characteristic against leakage of electrolytic solution, the beta-type nickel oxyhydroxide is not desired for use. To compensate for this, in order to use the beta-type nickel oxyhydroxide for composing active material of the primary batteries, it is essential that self-discharge rate be lowered effectively. As a solution for this, conventionally, gamma-type nickel oxyhydroxide with less self-discharge rate has been used against the beta-type nickel oxyhydroxide.

It is conceived that self-discharge and the resultant generation of oxygen are caused by decomposition of ion substance such as $NO_3^-$ and $CO_3^{2-}$ present in its crystal occurred inside of the battery. Such an ion substance remains inside of crystal as impurities in the course of producing nickel oxyhydroxide. It is conceived however that self-discharge characteristic of nickel oxyhydroxide can be improved by way of decreasing the above impurities.

On the other hand, it is also conceived that the deterioration of the storage characteristic of nickel oxyhydroxide is caused by diluted electrolytic solution, where dilution of electrolytic solution is caused by solidification of alkaline cation present in the electrolytic solution within lattice via infiltration of alkaline cation between layers of nickel oxyhydroxide relative to passage of time. Note that nickel oxyhydroxide itself is multi-layer compound constituted with cadmium iodide crystals.

Based on the above conception, according to the findings of inventors, initially, by applying a chemical oxidizing method to cause nickel oxyhydroxide to be oxidized in chemical solution containing a suitable oxidizing agent such as sodium hypochlorite and a suitable alkaline substance such as lithium hydroxide, sodium hydroxide, and potassium hydroxide, for example, nickel oxyhydroxide was synthesized.

It was found that, in the course of synthesizing nickel oxyhydroxide, independently of the kind including gamma and beta types, the above-referred ion of impurities flowed into the synthesizing solution from the crystals to result in the generation of such nickel oxyhydroxide with decreased self-discharge characteristic and improved suitability for composing active material of the primary batteries.

Oxidation reaction generated in the above experiment is expressed by way of the following:

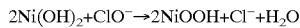

Note that, depending on pH value in the chemical solution, type of the resultant nickel oxyhydroxide differs. More particularly, when the pH value is less than a certain value, high-density beta-type nickel oxyhydroxide with 4.68 g/cm³ of theoretical density is generated. On the other hand, when the pH value exceeds a certain value, low-density gamma-type nickel oxyhydroxide with 3.79 g/cm³ of theoretical density is generated. In the nickel-zinc battery 1 related to the present invention, in order to secure a greater capacity for the battery, among the above-referred nickel oxyhydroxides generated via the above-referred chemical oxidizing method, it is preferred that high-density beta-type nickel oxyhydroxide be used for composing positive electrode active material.

It is further desired that high-density nickel hydroxide comprising substantially spherical particles be used for a starting raw material. Normally, conventional nickel hydroxide comprises non-spherical particles each having 1.4~1.8 g/cm³ of tap density and 1.0~1.4 g/cm³ of bulk density. On the other hand, the above-referred high-density nickel hydroxide comprises substantially spherical particles each having 2.0~2.5 g/cm³ of tap density and 1.4~1.8 g/cm³ of bulk density respectively being higher than those of conventional nickel hydroxide.

Method of measuring the tap density and the bulk density is described below. Initially, objective powder particles are fed into a specific container via natural fall. Assuming that mass is expressed by A(g), volume B(cm³), and another volume is C(cm³) after softly tapping bottom of the lifted container 200 times against a desk, then, the bulk density and the tap density are defined by formulas shown below.

Bulk density=A/B (g/cm³)
Tap density=A/C (g/cm³)

It is desired that the tap density and the bulk density of beta-type nickel oxyhydroxide for forming positive electrode active material specified in the embodiment of the present invention shall remain in a range defined below. More particularly, the tap density of the beta-type nickel oxyhydroxide shall remain in a range of 2.2~2.7 g/cm³, whereas the bulk density of the beta-type nickel oxyhydroxide shall remain in a range of 1.6~2.2 g/cm³. This is because, if the tap density and the bulk density remain less than the lower limit values, it is quite difficult to expand discharge capacity, and yet, it is quite difficult to produce such beta-type nickel oxyhydroxide having greater values of the tap density and the bulk density beyond the upper limit of the defined ranges.

Figure 2B:
FIG. 2 is explanatory of substantially spherical beta-type nickel oxyhydroxide (A) realized by the present invention and conventional non-spherical beta-type nickel oxyhydroxide (B)
Figure 2B:
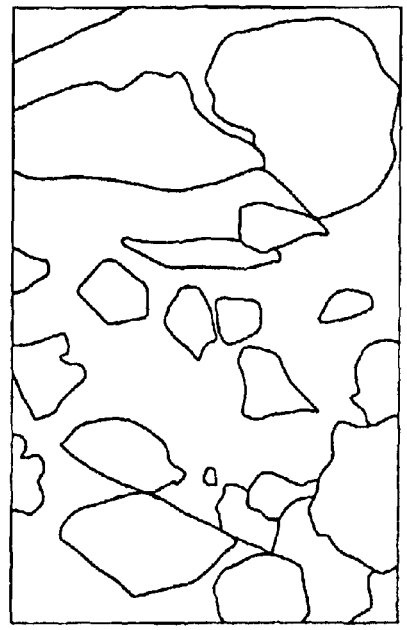
Figure 2A:
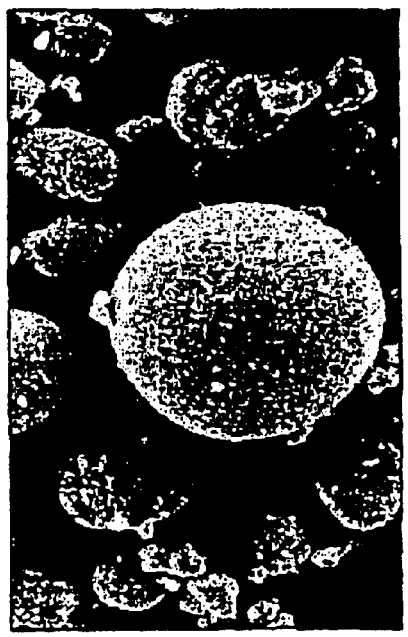
Figure 2A:
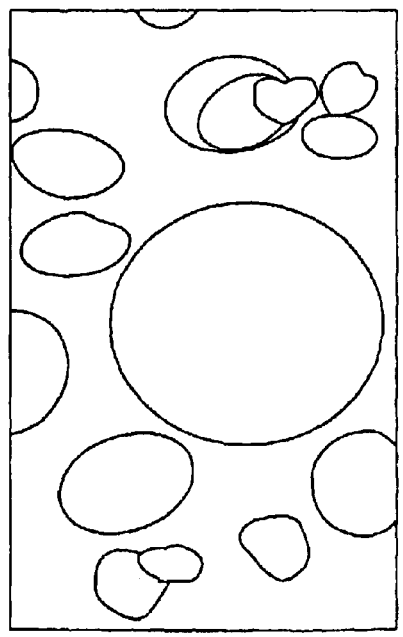

FIG. 2A exemplifies the inventive beta-type nickel oxyhydroxide comprising substantially spherical particles. FIG. 2B exemplifies conventional beta-type nickel oxyhydroxide comprising non-spherical particles. The upper side shown in FIGS. 2A and 2B designates photographs of the inventive beta-type nickel oxyhydroxide and the conventional beta-type nickel oxyhydroxide taken via an electronic microscope. Photographs shown in the lower side designate external form of particles shown in the upper side.

As shown in FIG. 2A, the inventive beta-type nickel oxyhydroxide comprises substantially spherical particles. More particularly, particle surface is relatively smooth without presence of projections. Although there are some of slender and flat particles, as a whole, particles are substantially spherical.

On the other hand, as shown in FIG. 2B, conventional beta-type nickel oxyhydroxide comprises non-spherical particles showing such a form crushed into powder from a large mass, where each particle is squarish, and yet, there are a variety of forms including flat form, slender form, and substantially cubic form.

Figure 3:
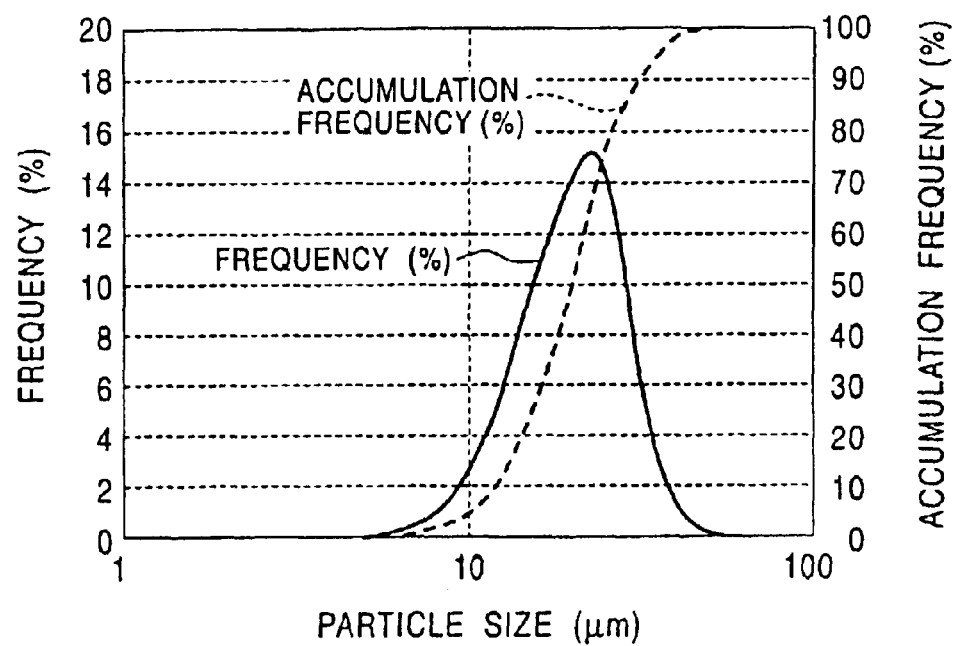
FIG. 3 exemplifies grading distribution of the beta-type nickel oxyhydroxide according to a practical form for embodying the present invention.

FIG. 3 exemplifies an example of grading distribution of the inventive beta-type nickel oxyhydroxide. It is desired that the inventive beta-type nickel oxyhydroxide for composing a positive electrode active material for implementing the present invention shall remain within such a mean particle size and a grading distribution specified below. More particularly, it is desired that the inventive beta-type nickel oxyhydroxide shall remain in a range of 19~40 μm of mean particle size. This is because, if the mean particle size is less than 19 μm or beyond 40 μm, it causes production of batteries to become quite difficult. It is further desired that the inventive beta-type nickel oxyhydroxide shall remain in a range of 5~80 μm of the grading distribution.

It is further desired that mean particle size of the beta-type nickel oxyhydroxide shall remain in a range of 19~25 μm and the grading distribution shall remain in a range of 5~70 μm.

Here, minimum and maximum values of the grading distribution are defined as follows: when 5% of the entire grading values are a value or less than the value, the value is defined to be the minimum value, and when 95% of the entire grading value are a value or less than the value, the value is defined to be the maximum value.

When producing the beta-type nickel oxyhydroxide in accordance with the above method by applying high-density nickel hydroxide as a starting raw material, it is possible to produce such nickel hydroxide with higher tap density and higher bulk density to facilitate expansion of battery capacity.

Further, it is also desired that specific surface area of the beta-type nickel oxyhydroxide based on the BET method shall remain in a range of 3~50 m²/g. If the specific surface area based on the BET method is less than 3 m²/g., it will result in the difficulty to expand discharge capacity when discharging large current in particular. Conversely, if the specific surface area based on the BET method exceeds 50 m²/g., even the beta-type nickel oxyhydroxide has a relatively large amount of self-discharge, which results in difficulty in securing sufficient storage characteristic.

Further, by way of mixing beta-type nickel oxyhydroxide yielded from nickel hydroxide via chemical oxidation process with such an aqueous solution (devoid of oxidizing agent) comprising one kind among lithium hydroxide, sodium hydroxide, and potassium hydroxide, or two kinds or more than two kinds selected therefrom, and then, by causing alkaline cation to infiltrate into interface of layers of beta-type nickel oxyhydroxide, the inventors discovered that such beta-type nickel oxyhydroxide having such a storage characteristic surpassing that of conventional beta-type nickel oxyhydroxide was secured while preserving high-density proper to the beta-type nickel oxyhydroxide.

It is desired that composition of alkaline cation in the beta-type nickel oxyhydroxide generated via the above method shall remain in a range of 2~5% by weight. It is further preferred that the composition of alkaline cation shall remain in a range of 3~5% by weight. If the composition is less than 2% by weight, then, the amount of alkaline cation infiltrated between layers of the beta-type nickel oxyhydroxide will become short whereby storage characteristic can hardly be improved. Although a greater amount of alkaline cation may be able to infiltrate between layers by applying higher pressure via an autoclave, for example, if the composition of alkaline cation exceeds 5% by weight, then, the above beta-type nickel oxyhydroxide will be transmuted into low-density gamma-type nickel oxyhydroxide to lose own high-density of the positive electrode active material.

FIG. 4 exemplifies the relationship between the composition of potassium in the beta-type nickel oxyhydroxide after being treated with aqueous solution of potassium hydroxide and the diffraction figure of powder via an X-ray treatment.

Figure 4A:
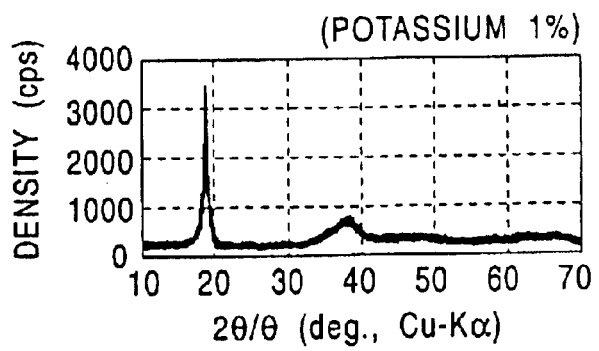
FIGS. 4A to 4D exemplify the relationship between the composition of potassium in nickel oxyhydroxide after completing a process for treating the beta-type nickel oxyhydroxide with aqueous solution of potassium hydroxide and the diffraction figure of powder via X-ray analysis.
Figure 4B:
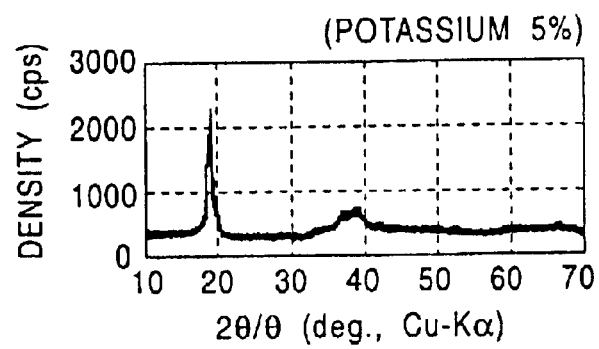
Figure 4C:
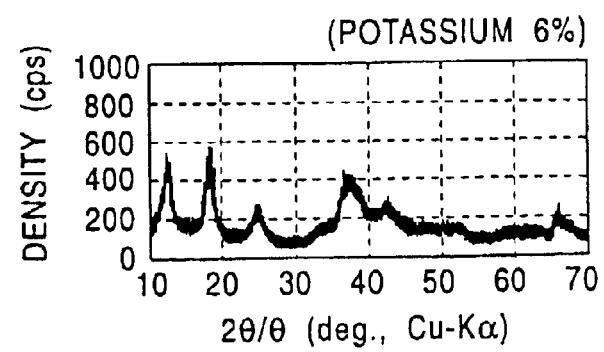
Figure 4D:
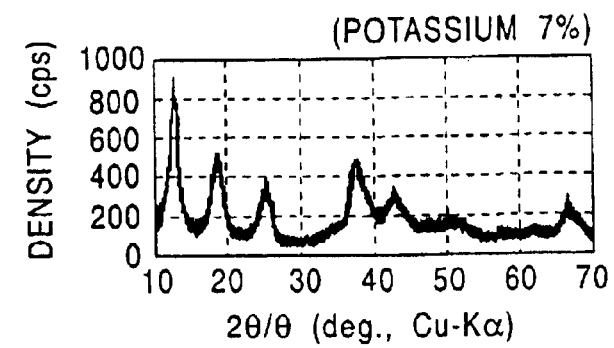

The X-ray diffraction patterns shown in FIG. 4A and FIG. 4B designate patterns of the beta-type nickel oxyhydroxide. These drawings represent that nickel oxyhydroxide still preserves the beta-form when the contents of potassium ion is less than 5% by weight. The X-ray diffraction patterns shown in FIG. 4C and FIG. 4D designate patterns of the gamma-type nickel oxyhydroxide. It is thus understood that the beta-type nickel oxyhydroxide is transmuted into the gamma-type nickel oxyhydroxide when the contents of potassium ion exceeds 6% by weight.

When utilizing nickel oxyhydroxide as a positive electrode active material, there is a technical problem to solve because nickel oxyhydroxide and nickel hydroxide generated from nickel oxyhydroxide via discharge respectively contain a low degree of electron conductivity. Accordingly, in order to promote utility of the positive electrode active material, it is preferred to mix graphite powder with the positive electrode mixture. On the other hand, when forming such a nickel-zinc battery comprising "inside-out" structure by way of providing external circumference of the nickel-zinc battery with a positive electrode comprising the blend of nickel oxyhydroxide at least mixed with graphite powder formed into a hollow-cylindrical configuration in particular, and yet, by way of providing the center portion with a gelled negative electrode comprising the blend of zinc for composing negative electrode active material, electrolytic solution, which are at least mixed with gelling agent, and yet, by way of further disposing a separator between the positive electrode and the negative electrode, inventors discovered that desirable contents of graphite powder against total weight of the positive electrode ranged from 4% by weight to a maximum of 8% by weight.

When there is less than 4% by weight of the contents of graphite powder, it will not be able to fully improve electron conductivity in the positive electrode. On the other hand, when there is more than 8% by weight of the contents of graphite powder, although electron conductivity in the positive electrode can be promoted to full extent, amount of nickel oxyhydroxide to be filled in the positive electrode as activating material decreases to result in the contracted capacity of the battery. By way of properly arranging the contents of graphite powder to be mixed in the positive electrode mixture, the nickel-zinc battery 1 realized by the present invention can secure optimal electron conductivity and storage capacity throughout service life.

EXAMPLE

Next, concrete examples for implementing the present invention are described below. It should be understood however that the scope of the present invention is not solely limited to the following examples.

First, physical characteristics of nickel oxyhydroxide are described below.

Initially, by way of chemically oxidizing electrolyzed manganese dioxide and high-density nickel hydroxide, a first beta-type nickel oxyhydroxide was generated. The above high-density nickel hydroxide was composed of substantially spherical particles based on 2.3 g/cm$^3$ of tap density and 1.8 g/cm$^3$ of bulk density. The above first beta-type nickel oxyhydroxide was composed of substantially spherical particles based on 2.5 g/cm$^3$ of tap density; 2.0 g/cm$^3$ of bulk density, 20 μm of mean particle size; and 5~70 μm of grading distribution. The above chemical oxidation was executed in alkaline solution containing sodium hypochlorite. Next, a gamma-type nickel oxyhydroxide was generated by chemically oxidizing in the same manner as described above. The above gamma-type nickel oxyhydroxide was composed of substantially spherical particles based on 1.8 g/cm$^3$ of tap density and 1.6 g/cm$^3$ of bulk density. Next a second beta-type nickel oxyhydroxide was generated by chemically oxidizing a gamma-type nickel oxyhydroxide and conventional nickel hydroxide. The second beta-type nickel oxyhydroxide was composed of non-spherical particles based on 1.8 g/cm$^3$ of tap density and 1.4 g/cm$^3$ of bulk density. Next, based on the composition specified in FIG. 11, the first beta-type nickel oxyhydroxide, the gamma-type nickel oxyhydroxide, the second beta-type nickel oxyhydroxide, graphite particles, and 40% by weight of aqueous solution of potassium hydride, were fully mixed with each other to complete formulation of the positive electrode active agent. Next, the prepared positive electrode active agents were pressurized by applying identical condition to mold them into a hollow cylindrical configuration before completing the positive electrodes related to the present invention. Note that the mixed graphite had 6 μm of mean particle size, 1~25 μm of grading distribution, and a maximum of 0.3% by weight of ash component, as formulated into high-purity powder particles.

Initially, the positive electrode component was inserted in a battery can. Next, a separator comprising a polyolefin non-woven fabric complete with hydrophilic treatment was inserted into the positive electrode component. After feeding about 1 g of electrolytic solution, gelled negative electrode mixture comprising mixture of zinc, gelling agent, and electrolytic solution was further inserted into the battery can. Finally, aperture of the battery can was sealed with a sealing member attached with a washer and a current-collecting pin before completing production of alkaline batteries conforming to "AA"-size format as samples 1~4.

FIG. 11 represents composition (% by weight) of component materials for constituting the positive electrode and filling amount (g) of positive electrode mixture per nickel-zinc battery. Sample 1 represents an alkaline-manganese battery. Sample 2 represents a nickel-zinc battery using beta-type nickel oxyhydroxide generated via chemical oxidation of high-density nickel hydroxide (this is referred to as a first beta nickel-zinc battery henceforth). Sample 3 represents a nickel-zinc battery using gamma-type nickel oxyhydroxide generated via chemical oxidation of high-density nickel hydride (this is referred to as a gamma nickel-zinc battery henceforth). Sample 4 represents a nickel-zinc battery using beta-type nickel oxyhydroxide generated via chemical oxidation of conventional nickel hydroxide (this is referred to as a second beta nickel-zinc battery). Note that filling amount of positive electrode mixture per battery differs between respective samples. This is because density of the used positive electrode active material differs between respective samples.

Next, those batteries corresponding to samples 1~4 were subject to a discharge test and a loading test. The discharge test was conducted by way of executing discharge until battery voltage descended to 1.0V at 1500 mW of constant power. To execute the loading test, commercially available digital cameras ("CAMEDIA C-2000 ZOOM" with a zoom lens, a product and a registered trade name of Olympus Optical Co., Ltd., Tokyo, Japan, each being fitted with a LCD monitor screen and using four of "AA"-size batteries), were utilized. The loading test was executed by counting the number of still shots under still-photographic mode at 20° C. via an LCD monitoring screen without strobe-flashing at every minute.

Figure 5:
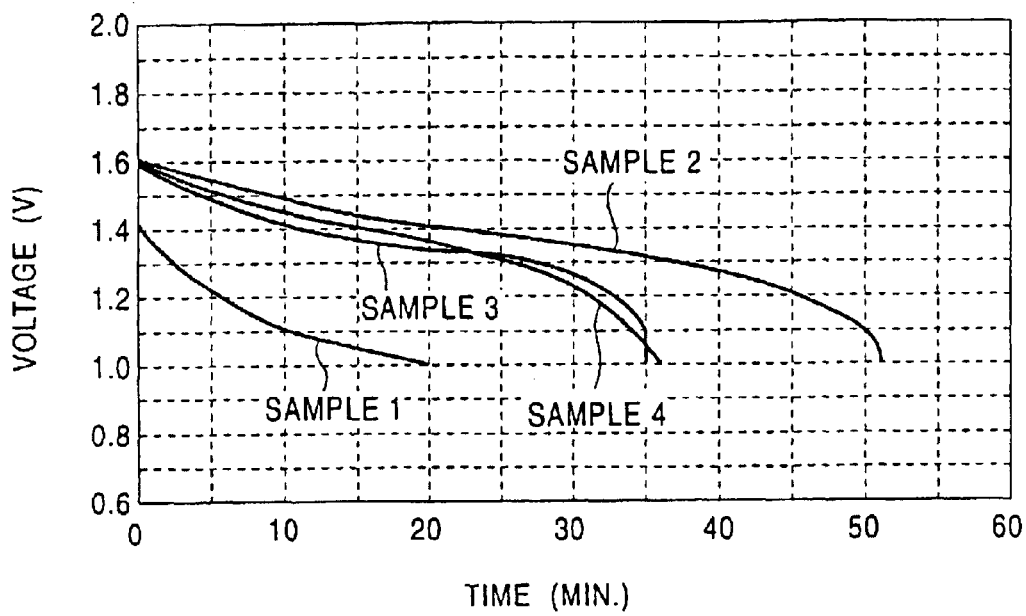
FIG. 5 exemplifies discharge curve when sample batteries 1~4 each containing 1500 mW of power executed discharge down to 1.0 V.
Figure 6:
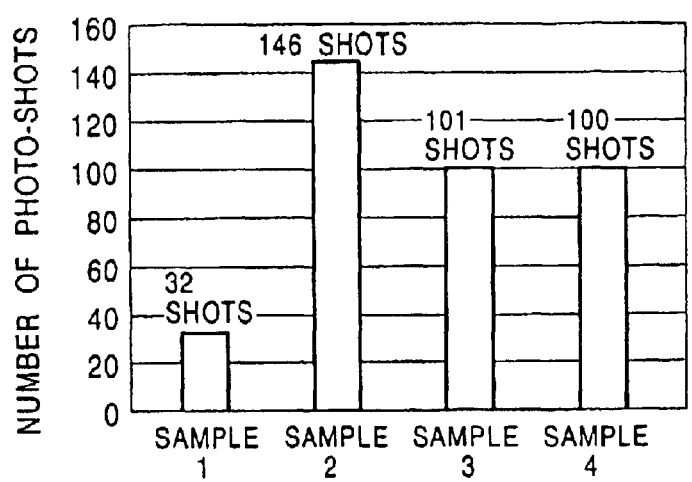
FIG. 6 exemplifies results of testing digital cameras loaded with sample batteries 1 to 4.
Figure 7:
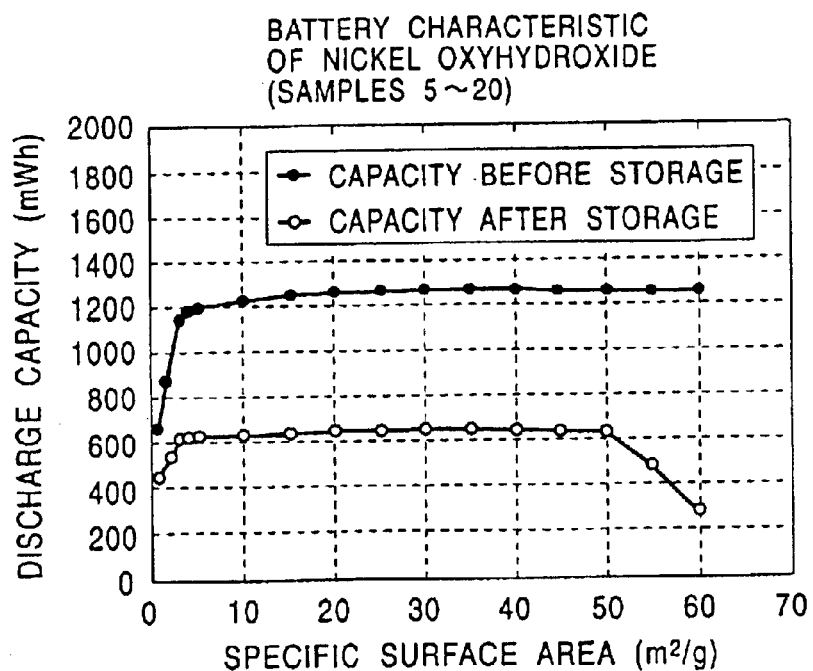
FIG. 7 exemplifies the relationship between specific surface area and discharge capacity of the positive electrode active material shown by sample batteries 5 to 20.
Figure 8:
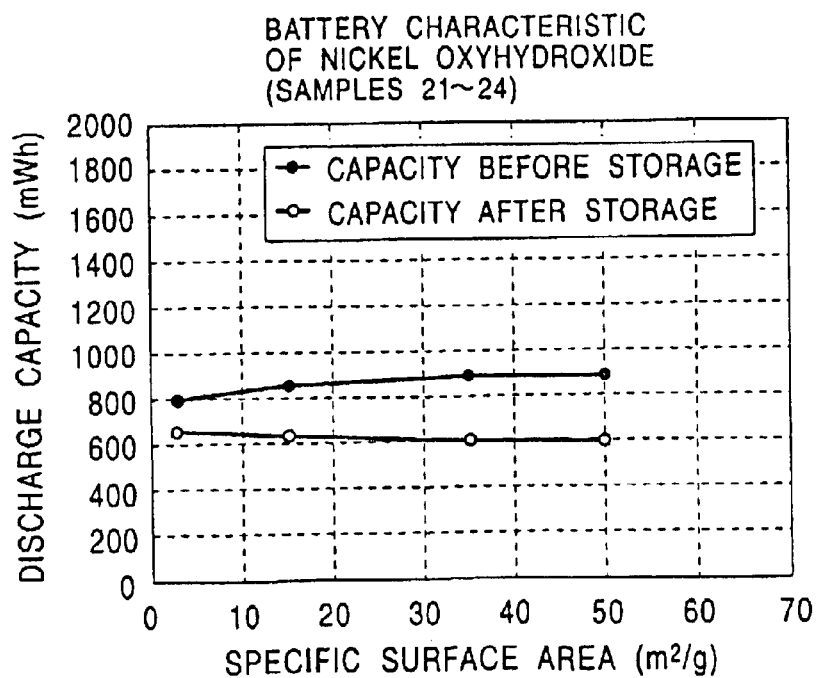
FIG. 8 exemplifies the relationship between specific surface area and discharge capacity of the positive electrode active material shown by sample batteries 21 to 24, FIG. 9 exemplifies the relationship between specific surface area and discharge capacity of the positive electrode active material shown by sample batteries 25 to 28.
Figure 9:
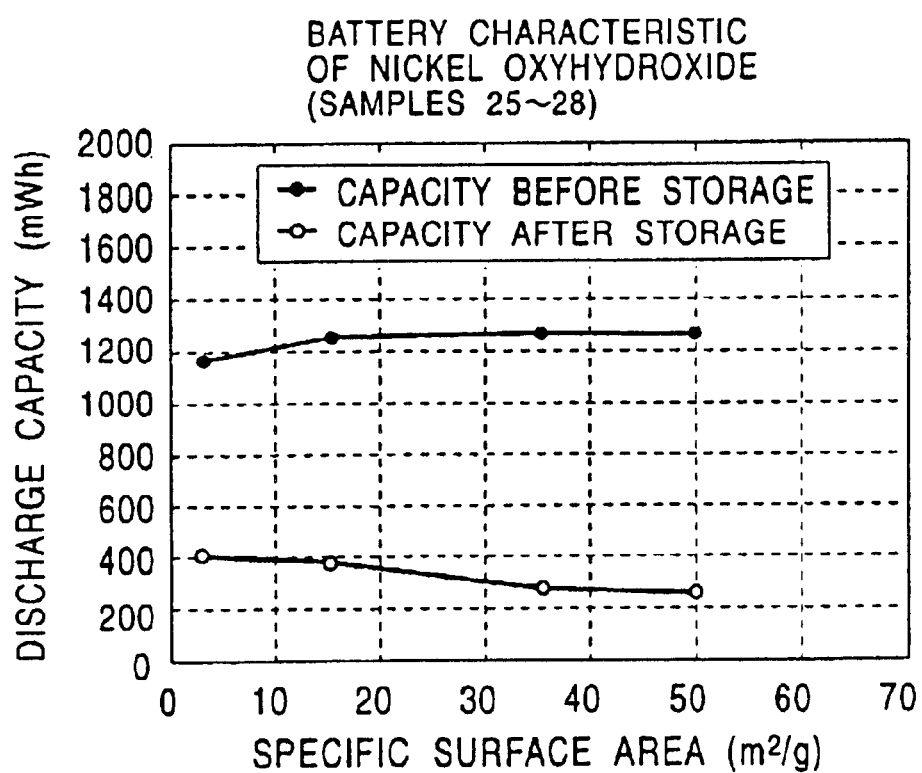

Discharge curve and discharge capacity of the sample batteries 1~4 are respectively shown in FIG. 5 and FIG. 12. Test result via loading of sample batteries 1~4 in the digital cameras is shown in FIG. 6.

By referring to FIG. 12 and FIG. 5, it is understood that, compared to the alkaline manganese battery corresponding to sample 1, the first beta nickel-zinc battery corresponding to sample 2, the gamma nickel-zinc battery corresponding to sample 3, and the second beta nickel-zinc battery corresponding to sample 4 respectively generate quite distinguished discharge characteristic under heavy load. Further, as shown in FIG. 6, it is also understood that those batteries corresponding to samples 2~4 are respectively durable to use for a longer period of time than the alkaline-manganese battery corresponding to sample 1 even when actually being loaded in a compact-size portable electronic apparatus.

Compared to the gamma nickel-zinc battery as sample 3 and the second beta nickel-zinc battery as sample 4, the first beta nickel-zinc battery as sample 2 generates more distinguished discharge characteristic. Inasmuch as the nickel oxyhydroxide contained in the sample 2 is of the highest density, it is thus conceived that the sample 2 contains a greater weight of positive electrode mixture per battery than that of the samples 3 and 4, in other words, the sample 2 contains a greater capacity of the positive electrode.

Next, specific surface area of the positive electrode active material is described below.

Initially, beta-type nickel oxyhydroxide comprising substantially spherical particles were generated by chemically oxidizing high-density nickel hydroxide, where the high-density nickel hydroxide was composed of substantially spherical particles based on 2.3 g/cm$^3$ of tap density and 1.8 g/cm$^3$ of bulk density; the above chemical oxidizing process was executed in alkaline solution containing sodium hypochlorite. A variety of beta-type nickel oxyhydroxides with specific surface area in a range of 1~60 m$^2$/g based on BET method were prepared. Next, based on 85:8:7 of weight ratio, the prepared beta-type nickel oxyhydroxides, graphite, and aqueous solution of potassium hydride (40% by weight), were fully mixed with each other before completing production of positive electrode mixture. Like the preceding sample 2, a number of "AA"-size format compact alkaline batteries were prepared as samples 5~20.

In addition, as in the above description, gamma-type nickel oxyhydroxides were generated by chemical oxidation. A variety of gamma-type nickel oxyhydroxide with specific surface area in a range of 3~50 m$^2$/g based on BET method were prepared. Except for those which were used for composing a positive electrode active material, as in the sample 3, "AA"-size format alkaline batteries were prepared as samples 21~24.

In addition, by electrolytically oxidizing conventional nickel hydroxide, a variety of beta-type nickel oxyhydroxides having specific surface area in a range of 3~50 m$^2$/g based on BET method were prepared. Except for those which were used for composing positive electrode active material, like the preceding sample 4, "AA"-size format compact alkaline batteries were prepared as samples 25~28.

Next, discharge test was executed against the prepared samples 5~28 by continuously discharging voltage until reaching 1.0V at 1500 mW of constant power at 20° C. of atmospheric temperature. One of the discharge tests was executed against those sample batteries aged for two weeks at 20° C. after the formation of batteries. Other tests were executed against those which were stored for 20 days at 60° C. of atmosphere after elapsing two weeks of initial storage period at 20° C. from the date of completing production thereof.

Results of discharge test executed against samples 5~28 are shown in FIG. 13 and FIGS. 7~9.

By referring to FIG. 13 and FIGS. 7~9, as a result of testing samples 5~20 comprising beta-type nickel oxyhydroxides for composing a positive electrode via chemical oxidation process, it is understood that samples 7~18 utilizing beta-type nickel oxyhydroxide each having 3~50 m$^2$/g of specific surface area based on BET method respectively generate quite distinguished discharge characteristic under heavy load and durable storage characteristic. On the other hand, despite of satisfactory storage characteristic, those samples 21~24 utilizing gamma-type nickel oxyhydroxide for composing a positive electrode via chemical oxidation process respectively fail to generate distinguished discharge characteristic under heavy load. Conversely, despite of sufficient discharge characteristic under heavy load, those samples 25~28 utilizing beta-type nickel oxyhydroxide for composing positive electrode via electrolytic oxidation process respectively prove to be noticeably poor in the storage durability.

Based on the above results, it is understood that, in terms of the nickel-zinc battery related to the present invention, beta-type nickel oxyhydroxide generated via chemical oxidation of high-density nickel hydroxide should desirably be utilized for composing positive electrode active material. It is further understood that use of such a beta-type nickel oxyhydroxide having own specific surface area within a range of 3~50 m$^2$/g via BET method is desirable.

Next, a method of treating beta-type nickel oxyhydroxide in alkaline solution is described below.

Initially, beta-type nickel oxyhydroxide generated by chemical oxidation of high-density nickel hydroxide was mixed with aqueous solution of potassium hydroxide, and then, adjustment was effected against density of aqueous solution of potassium hydroxide, mixing temperature, mixing time, and mixing pressure. It was so arranged that net contents of potassium in the final formulation of the beta-type nickel oxyhydroxide precisely range from 0.5% by weight to a maximum of 5.0% by weight. Note that the above-referred high-density nickel hydroxide was composed of substantially spherical particles based on 2.3 g/cm$^3$ of tap density and 1.8 g/cm$^3$ of bulk density. The above chemical oxidation process was executed in alkaline solution containing sodium hypochlorite. The resultant beta-type nickel oxyhydroxide was composed of substantially spherical particles each having 20 $\mu$m of mean particle size based on 2.5 g/cm$^3$ of tap density, 2.0 g/cm$^3$ of bulk density, and 5~70 $\mu$m of grading distribution. The processing condition is shown in FIG. 14.

During the test, whenever pressurizing process was required, reaction is implemented via an autoclave. The beta-type nickel oxyhydroxide and potassium hydroxide (40% by weight) prior to treatment were arranged to be 1:5 of weight ratio. After completing the treatment, separation and washing were executed against the beta-type nickel oxyhydroxide.

It is desired that concentration of potassium hydroxide be in a range from 30% by weight to a maximum of 45% by weight. If concentration of potassium remains below 30% by weight, then it will become difficult to terminate reaction. On the other hand, it is quite hard to procure such potassium hydroxide aqueous solution having more than 45% by weight of concentration from industrial sources.

Assuming that potassium hydroxide has 40% by weight of concentration for example, in terms of weight ratio between beta-type nickel oxyhydroxide and potassium hydroxide prior to the treatment, it is desired that weight ratio of potassium hydroxide remain within a range from 3 to 10 against 1 of that of beta-type nickel oxyhydroxide. This is because, if the weight ratio is less than 3, then, it will become difficult to terminate reaction. Conversely, if the weight ratio exceeds 10, it will entail difficulty to separate and wash the beta-type nickel oxyhydroxide after completing a reaction process. Further, as is obvious from FIG. 14, it is desired that reaction temperature be held within a range of 40° C.~60° C. Further, it is also desired that reaction time be held within a range of approximately 10 hours~60 hours. Further, it is also desired that reaction pressure be held within a range from normal pressure to a maximum of 0.9 Mpa.

Test result evidenced that the form of the beta-type nickel oxyhydroxide impregnated with alkaline cation between layers produced via the above-referred alkaline treatment was substantially identical to that of the other beta-type nickel oxyhydroxide generated via chemical oxidation of high-density nickel hydroxide.

Further, test result evidenced that mean particle size, grading distribution, bulk density, and tap density of the beta-type nickel oxyhydroxide containing alkaline cation were substantially identical to those of the other beta-type nickel oxyhydroxide generated via chemical oxidation of high-density nickel hydroxide.

Next, based on the composition shown in FIG. 15, a positive electrode mixture was prepared by fully mixing the beta-type nickel oxyhydroxide generated via chemical oxidation of high-density nickel hydroxide, the other beta-type nickel oxyhydroxide generated via an alkaline treatment process, graphite powder, and aqueous solution of potassium hydroxide. Note that the graphite power is formulated as high-purity graphite powder comprising 6 $\mu$m of mean particle size, 1~25 $\mu$m of grading distribution, and a maximum of 0.3% by weight of ash component. Then, like the above example, a number of "AA"-size format alkaline batteries were produced as samples 29~39.

Sample 29 was prepared with the beta-type nickel oxyhydroxide generated via chemical oxidation of high-density nickel hydroxide. Samples 30~39 were respectively prepared with the other beta-type nickel oxyhydroxide complete with the above alkaline treatment. FIG. 15 designates composition (% by weight) of component materials for composing the positive electrode, composition (% by weight) of potassium dispersed in the beta-type nickel oxyhydroxide, and filling amount (gram) of the positive electrode mixture per battery. Composition (% by weight) of potassium dispersed in the beta-type nickel oxyhydroxide was quantitatively analyzed by applying an atomic light-absorptive analysis method.

Those batteries corresponding to samples 29~39 were then stored for 20 days at 60° C., and then treated with a discharge test until the voltage reached 1.0V at 100 mW, 500 mW, 1000 mW, and 1500 mW of constant power. Discharge capacity of batteries corresponding to samples 29~39 before and after storage is shown in FIG. 16, FIG. 17, and FIG. 10.

Figure 10:
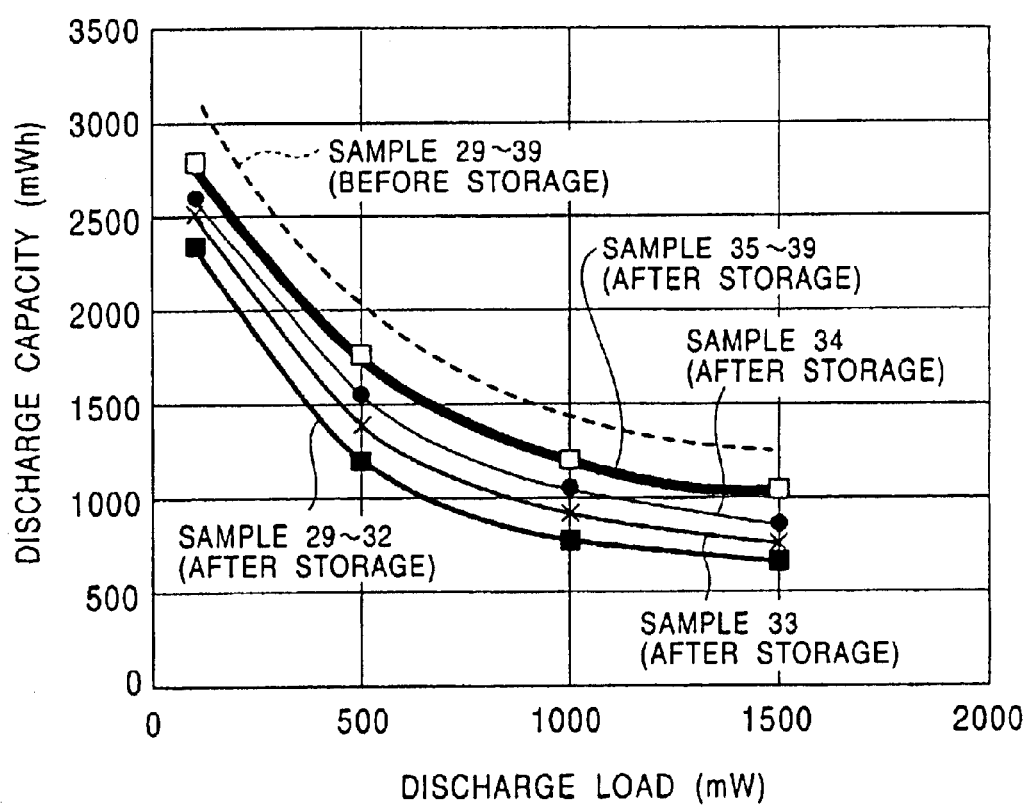
FIG. 10 exemplifies the relationship between specific surface area and discharge capacity of the positive electrode active material shown by sample batteries 29~39.
Figure 20:
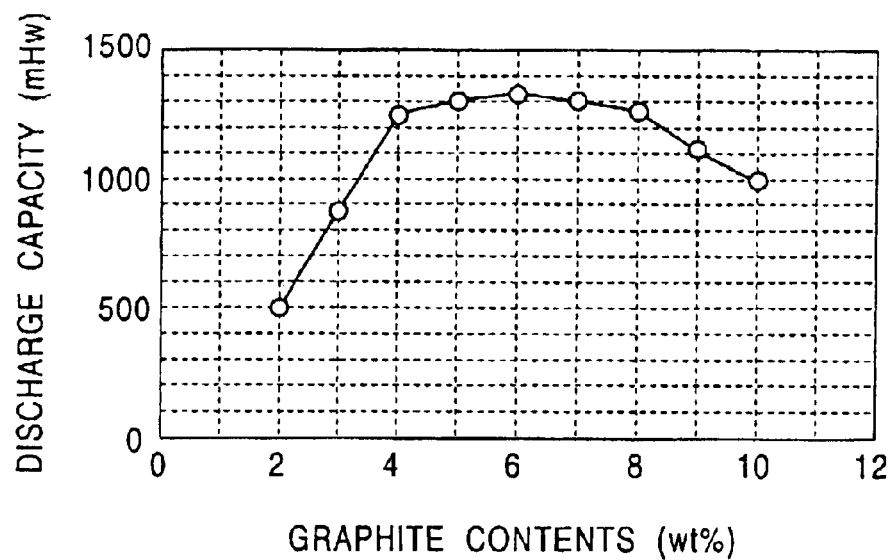
FIG. 20 exemplifies the relationship between graphite contents in the positive-polar composing material and discharge capacity.

By referring to FIG. 16 and FIG. 10, it is evidenced that those batteries corresponding to samples 29~39 prior to storage respectively generated a substantially identical value of discharge capacity at 100 mW, 500 mW, 1000 mW, and 1500 mW of constant power.

By referring to FIG. 16, FIG. 17, and FIG. 10, it is understood that, compared to the sample 29 comprising the beta-type nickel oxyhydroxide generated via chemical oxidation of high-density nickel hydroxide, the sample 33 incorporating more than 2% by weight of potassium in the beta-type nickel oxyhydroxide incurred less degradation of capacity after storage as a result of treatment with alkaline solution. It was further clarified from the test results of samples 35~39 that further degradation of capacity could be prevented from occurrence by way of providing a minimum of 3% by weight of potassium composition. When there is a maximum of 2% by weight of potassium composition in the beta-type nickel oxyhydroxide, improved effect can hardly be generated in the storage characteristic of batteries. Conceivably, inasmuch as the amount of potassium ion infiltrated between layers of the beta-type nickel oxyhydroxide via an alkaline treatment remains short, potassium ion present in electrolytic solution is absorbed into the beta-type nickel oxyhydroxide during storage, whereby causing concentration of the electrolytic solution to be diluted.

The above description has solely referred to the case in which aqueous solution of potassium hydroxide was utilized for executing an alkaline treatment process. However, according to the test result, substantially identical results were also generated even when utilizing aqueous solution of lithium hydroxide and aqueous solution of sodium hydroxide as well. Based on this result, it is conceived that substantially identical results will also be secured even when utilizing these alkaline aqueous solutions via mixture and even when more than two kinds of alkaline cations are mixed together inside of the lattice of the beta-type nickel oxyhydroxide.

Based on the above result, in the formation of the nickel-zinc battery according to a preferred form for embodying the present invention, it is clarified from the process for enabling alkaline cationic seed to infiltrate itself between layers of the beta-type nickel oxyhydroxide that composition of the alkaline cationic seed after completion of the process should desirably be arranged to be in a range from 2% by weight to a maximum of 5% by weight, more preferably, in a range from 3% by weight to a maximum of 5% by weight before utilizing the beta-type nickel oxyhydroxide to serve as the positive electrode active material.

The above description related to the above-referred alkaline treatment has solely referred to the beta-type nickel oxyhydroxide comprising substantially spherical particles. It should be understood, however that the form of the beta-type nickel oxyhydroxide is not solely limited to the above substantially spherical configuration, but the present invention is also applicable to a variety of forms other than the spherical configuration as well.

Next, the amount of contents of graphite formulated in the positive electrode mixture is described below.

Initially, based on the composition shown in FIG. 18, beta-type nickel oxyhydroxide generated via chemical oxidation of high-density nickel hydroxide, graphite, and 40% by weight of aqueous solution of potassium hydroxide, were fully mixed with each other to produce positive electrode mixture, and then, like the above example, a number of "AA"-size format alkaline batteries were produced as samples 40–48. Note that the above beta-type nickel oxyhydroxide was composed of substantially spherical particles each having 20 μm of mean particle size, based on 2.5 g/cm³ of tap density, 2.0 g/cm³ of bulk density, and 5~70 μm of grading distribution. The above-referred high-density nickel hydroxide is composed of substantially spherical particles based on 2.3 g/cm³ of tap density and 1.8 g/cm³ of bulk density. The above chemical oxidation was executed in alkaline solution containing sodium hypochlorite. The above graphite was formulated as high-purity graphite powder comprising 6 μm of mean particle size, 1~25 μm of grading distribution, and a maximum of 0.3% of ash component.

Like the preceding examples, those batteries corresponding to samples 40–48 were respectively treated with discharge test until the voltage reached 1.0V at 1500 mW of constant power. Test results of discharge capacity of the samples 40–48 are shown in FIG. 19 and FIG. 11.

By referring to FIG. 19 and FIG. 11, it was clarified that better effect was secured by adding a minimum of 4% by weight and a maximum of 8% by weight of graphite against the total weight of the positive electrode as the proper amount to be included in the positive electrode mixture. Since nickel oxyhydroxide and nickel hydroxide as the one generated via discharge respectively contain a low degree of electron conductivity, it is conceived that, when the graphite contents are less than 4% by weight in the positive electrode mixture, such an effect for improving electron conductivity in the positive electrode can not fully be secured. On the other hand, when the graphite contents exceed 8% by weight, despite of enough effect to improve electron conductivity in the positive electrode, as a result of the decreased filling amount of nickel oxyhydroxide as the positive electrode active material, in consequence, battery capacity itself is contracted.

Based on the above results, it was clarified that the amount of graphite to be included in the positive electrode mixture should desirably be defined to be a minimum of 4% by weight and a maximum of 8% by weight against the total weight of the positive electrode.

Although the above description pertaining to practical aspects for embodying the present invention has solely referred to the nickel-zinc battery as a primary battery. It should be understood however that the scope of the present invention is by no means restricted to the primary battery, but the scope of the present invention is also applicable to other nickel-zinc batteries serving as a secondary battery.

Further, the above description has also referred to a cylindrical nickel-zinc battery. However, the scope of the present invention is not solely limited to the cylindrical battery, but the present invention is also applicable to those nickel-zinc batteries with a flat shape and other shapes as well.

Further, it should also be understood that, not only the above-referred practical aspects, but also the present invention may also introduce a variety of forms and constitutions within such a scope that does not deviate from the essentials of the present invention.

What is claimed is:

1. A positive electrode active material comprising beta nickel oxyhydroxide, wherein said beta nickel oxyhydroxide contains between 2% by weight to 5% by weight of alkaline cations.

2. The positive electrode active material according to claim 1, wherein said beta-type nickel oxyhydroxide comprises substantially spherical particles.

3. The positive electrode active material according to claim 1, wherein said alkaline cation substance comprises any one of or a combination of more than two selected from a group comprising Li+, Na+, and K+.

4. A nickel-zinc battery comprising: a positive electrode comprising mixed powder containing at least beta-type nickel oxyhydroxide being a positive electrode active material and graphite powder being an electric conductive agent; a negative electrode comprising gelled compound containing at least zinc being a negative electrode active material, electrolytic solution, and gelling agent for uniformly dispersing zinc and electrolytic solution; and a separator being disposed between said positive electrode and said negative electrode; wherein: said beta-type nickel oxyhydroxide has alkaline cation between its own layers.

5. The nickel-zinc battery according to claim 4, wherein said beta-type nickel oxyhydroxide comprises substantially spherical particles.

6. The nickel-zinc battery according to claim 4, wherein said alkaline cation substance comprises any one of or a combination of more than two selected from a group comprising Li+, Na+, and K+.

7. The nickel-zinc battery according to claim 4, wherein said beta-type nickel oxyhydroxide contains 2% by weight to a maximum of 5% by weight of alkaline cation substance therein.

8. The nickel-zinc battery according to claim 4, wherein said battery comprises a first part, a second part and a third part, and, wherein:

the second part is contiguous to the external surface of the first part, the third part is contiguous to the external surface of the second part, the first part contains the negative electrode material, the second part contains the separator, and the third part contains the positive electrode material.

9. The nickel-zinc battery according to claim 4, wherein said positive electrode mixed powder contains 4% by weight to 8% by weight of graphite powder.

* * * * *